(12) United States Patent
Dias (10) Patent No.: US 10,886,776 B1
(45) Date of Patent: Jan. 5, 2021

(54) POWER DISTRIBUTION SYSTEMS HAVING A BI-DIRECTIONAL LINK FOR DELIVERY OF POWER BETWEEN EACH AND RELATED METHODS

(71) Applicant: Lenovo Enterprise Solutions (Singapore) Pte. Ltd., New Tech Park (SG)

(72) Inventor: Israel Dias, Research Triangle Park, NC (US)

(73) Assignees: Lenovo Enterprise Solutions, New Tech Park (SG); (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 16/585,670

(22) Filed: Sep. 27, 2019

(51) Int. Cl.
| | |
|---|---|
| *H02J 9/06* | (2006.01) |
| *H02J 13/00* | (2006.01) |
| *G05B 23/02* | (2006.01) |
| *H02J 4/00* | (2006.01) |
| *G05B 11/32* | (2006.01) |
| *G06F 1/30* | (2006.01) |

(52) U.S. Cl.
CPC ............. *H02J 9/061* (2013.01); *G05B 11/32* (2013.01); *G05B 23/0289* (2013.01); *G06F 1/30* (2013.01); *H02J 4/00* (2013.01); *H02J 13/0017* (2013.01); *H02J 9/068* (2020.01)

(58) Field of Classification Search
CPC .......... H02J 9/061; H02J 4/00; H02J 13/0017; H02J 9/068; G05B 11/32; G05B 23/0289; G06F 1/30
See application file for complete search history.

(56) References Cited

U.S. PATENT DOCUMENTS

2009/0031153 A1   1/2009   Bahali et al.
2016/0371955 A1   12/2016  Alshinnawi et al.

*Primary Examiner* — Robert L Deberadinis
(74) *Attorney, Agent, or Firm* — Olive Law Group, PLLC (57) ABSTRACT

Power distribution systems having a bi-directional link for delivery of power between each other are disclosed. According to an aspect, a PDU includes a first power inlet configured to receive electric power from a power source. The PDU includes a second power inlet configured to receive electric power from another power distribution unit. The PDU also include an electric power router configured to determine whether the power source is in a fault condition for delivering electric power to the first power inlet. Further, the electric power router is configured to communicatively engage the other PDU for managing receipt of electric power from the other PDU based on the fault condition. The electric power router is configured to receive, at the second power inlet, electric power from the other PDU. The electric power router is also configured to route, to power outlets, the electric power received from the other PDU.

20 Claims, 6 Drawing Sheets

FIG. 6

# POWER DISTRIBUTION SYSTEMS HAVING A BI-DIRECTIONAL LINK FOR DELIVERY OF POWER BETWEEN EACH AND RELATED METHODS

TECHNICAL FIELD

The presently disclosed subject matter relates generally to power distribution. Particularly, the presently disclosed subject matter relates to power distribution systems having a bi-directional link for delivery of power between each other.

BACKGROUND

In data centers, power distributions units (PDUs) are often used to distribute electric power to servers and networking equipment via multiple outputs. A PDU may have different forms such as being a rack-mounted power strip to being a larger PDU that stands on the floor. Functions of a PDU include power filtering to improve power quality, intelligent load balancing, and remote monitoring and control.

In some instances, multiple PDUs may provide power to multiple servers and other equipment held by a server chassis. For example, in one server chassis one set of power supply units (PSUs) may be operably connected to one PDU, and another set of PSUs may be operably connected to another PDU. Each PSU may be connected to an individual server or other equipment held by the server chassis.

It is important to maintain a continuous supply of power to equipment within a data center, particularly to the servers and other equipment held by a server chassis. In an example of fault, power supplied to one PDU at a server chassis may fail, while the other continues to be supplied with power. In this scenario, unless action is taken or the system can manage the power supply failure, servers connected to the PDU no longer receiving power will also no longer receive power and thus can no longer operate. Therefore, there is a need to provide systems and techniques that can manage a power supply failure to PDU at a server chassis such that power supply to servers and other equipment at the server chassis is maintained.

BRIEF DESCRIPTION OF THE DRAWINGS

Having thus described the presently disclosed subject matter in general terms, reference will now be made to the accompanying Drawings, which are not necessarily drawn to scale, and wherein:

SUMMARY

The presently disclosed subject matter includes power distribution systems having a bi-directional link for delivery of power between each other. According to an aspect, a PDU includes a first power inlet configured to receive electric power from a power source. The PDU also includes a second power inlet configured to receive electric power from another power distribution unit. Further, the PDU includes multiple power outlets. The PDU also include an electric power router configured to determine whether the power source is in a fault condition for delivering electric power to the first power inlet. Further, the electric power router is configured to communicatively engage the other PDU for managing receipt of electric power from the other PDU in response to determining that the power source is in the fault condition. Also, the electric power router is configured to receive, at the second power inlet, electric power from the other PDU. The electric power router is also configured to route, to the power outlets, the electric power received from the other PDU.

According to another aspect, a PDU includes a power inlet configured to receive electric power from a power source. Further, the PDU includes a power outlet configured to deliver power to another PDU. The PDU also includes an electric power router configured to receive an indication from the other PDU that power is needed. The electric power router is also configured to route, to the other PDU, electric power received at the power inlet in response to receiving the indication.

According to another aspect, a power distribution system includes a power inlet configured to receive electric power from a first power source. The power distribution system also includes power outlets for distribution of the electric power received from the first power source. Further, the power distribution system includes an input/output module configured to receive from a second power distribution unit and to deliver electric power to the second power distribution unit via a bi-directional link cable operatively connecting the input/output module to a second input/output module of the second power distribution unit. The power distribution system also includes an electric power router configured to determine whether the power source is in a fault condition for delivering electric power to the power inlet. The electric power router is also configured to communicatively engage the other power distribution unit for managing receipt of electric power from the other power distribution unit in response to determining that the power source is in the fault condition. Further, the electric power router is configured to receive, at the input/output module, electric power from the other power distribution unit in response to determining that the power source is in the fault condition. The electric power router is also configured to route, to the power outlets, the electric power received from the other power distribution unit. Further, the electric power router is configured to receive an indication from the other power distribution unit that power is needed. The electric power router is also configured to route, to the other power distribution unit, electric power received at the power inlet in response to receiving the indication.

DETAILED DESCRIPTION

The following detailed description is made with reference to the figures. Exemplary embodiments are described to illustrate the disclosure, not to limit its scope, which is defined by the claims. Those of ordinary skill in the art will recognize a number of equivalent variations in the description that follows.

Articles "a" and "an" are used herein to refer to one or to more than one (i.e. at least one) of the grammatical object of the article. By way of example, "an element" means at least one element and can include more than one element.

"About" is used to provide flexibility to a numerical endpoint by providing that a given value may be "slightly above" or "slightly below" the endpoint without affecting the desired result.

The use herein of the terms "including," "comprising," or "having," and variations thereof is meant to encompass the elements listed thereafter and equivalents thereof as well as additional elements. Embodiments recited as "including," "comprising," or "having" certain elements are also contemplated as "consisting essentially of" and "consisting" of those certain elements.

Recitation of ranges of values herein are merely intended to serve as a shorthand method of referring individually to each separate value falling within the range, unless otherwise indicated herein, and each separate value is incorporated into the specification as if it were individually recited herein. For example, if a range is stated as between 1%-50%, it is intended that values such as between 2%-40%, 10%-30%, or 1%-3%, etc. are expressly enumerated in this specification. These are only examples of what is specifically intended, and all possible combinations of numerical values between and including the lowest value and the highest value enumerated are to be considered to be expressly stated in this disclosure.

Unless otherwise defined, all technical terms used herein have the same meaning as commonly understood by one of ordinary skill in the art to which this disclosure belongs.

The functional units described in this specification have been labeled as computing devices. A computing device may be implemented in programmable hardware devices such as processors, digital signal processors, central processing units, field programmable gate arrays, programmable array logic, programmable logic devices, cloud processing systems, or the like. The computing devices may also be implemented in software for execution by various types of processors. An identified device may include executable code and may, for instance, comprise one or more physical or logical blocks of computer instructions, which may, for instance, be organized as an object, procedure, function, or other construct. Nevertheless, the executable of an identified device need not be physically located together but may comprise disparate instructions stored in different locations which, when joined logically together, comprise the computing device and achieve the stated purpose of the computing device. In an example, a computing device can include a server operating in a data center. Servers and other computing devices may be operable to access the Internet (or other communications network).

An executable code of a computing device may be a single instruction, or many instructions, and may even be distributed over several different code segments, among different applications, and across several memory devices. Similarly, operational data may be identified and illustrated herein within the computing device, and may be embodied in any suitable form and organized within any suitable type of data structure. The operational data may be collected as a single data set, or may be distributed over different locations including over different storage devices, and may exist, at least partially, as electronic signals on a system or network.

The described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other methods, components, materials, etc. In other instances, well-known structures, materials, or operations are not shown or described in detail to avoid obscuring aspects of the disclosed subject matter.

As used herein, the term "memory" is generally a storage device of a computing device. Examples include, but are not limited to, read-only memory (ROM) and random access memory (RAM).

The device or system for performing one or more operations on a memory of a computing device may be a software, hardware, firmware, or combination of these. The device or the system is further intended to include or otherwise cover all software or computer programs capable of performing the various heretofore-disclosed determinations, calculations, or the like for the disclosed purposes. For example, exemplary embodiments are intended to cover all software or computer programs capable of enabling processors to implement the disclosed processes. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed below.

In accordance with the exemplary embodiments, the disclosed computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl, or other suitable programming languages.

As referred to herein, the terms "computing device" and "entities" should be broadly construed and should be understood to be interchangeable. They may include any type of computing device, for example, a server, a desktop computer, a laptop computer, or the like.

Figure 1:
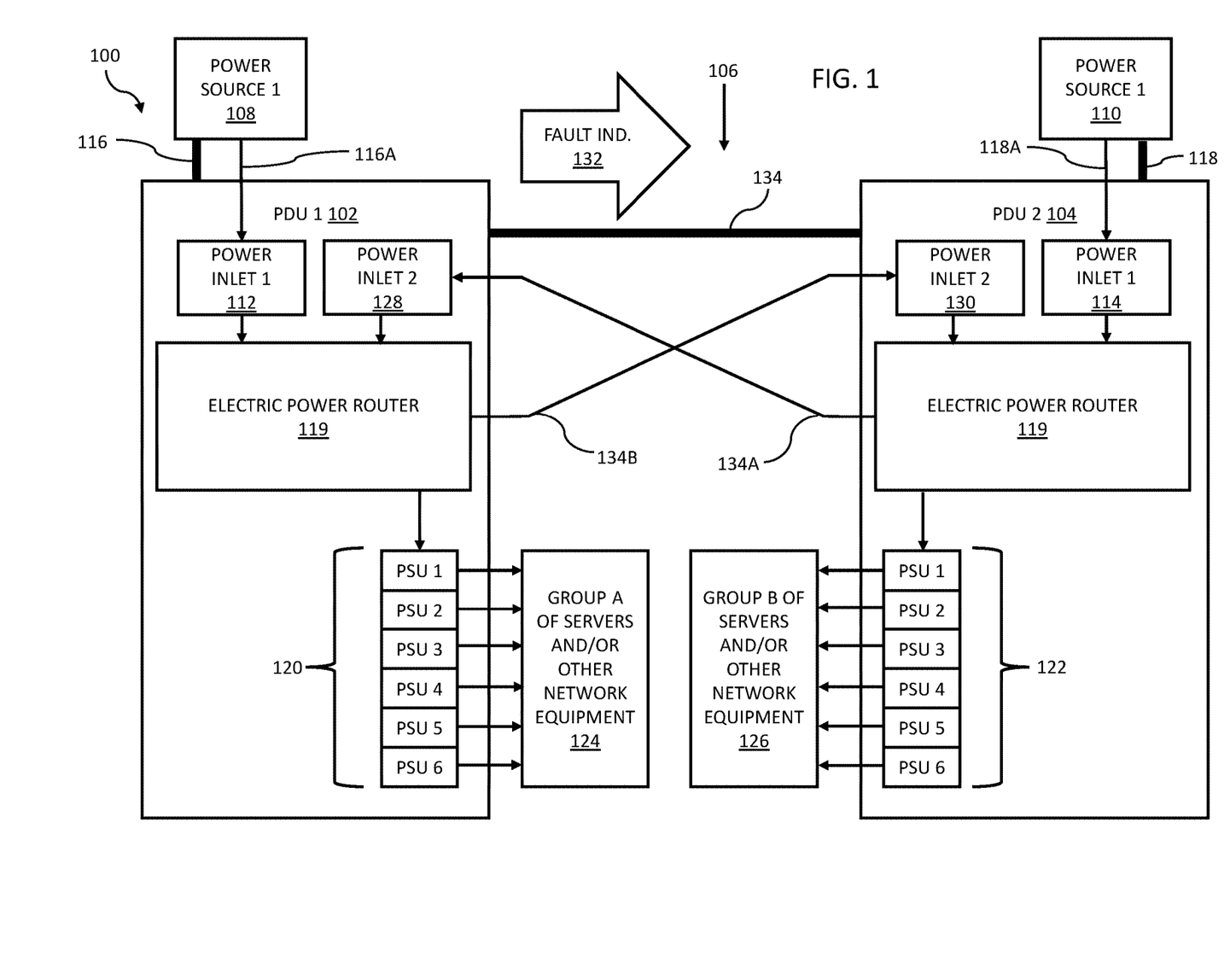
FIG. 1 is a block diagram of a power distribution system including power distribution units operatively connected together via a bi-directional link system for delivery of power between each other in accordance with embodiments of the present disclosure.

FIG. 1 illustrates a block diagram of a power distribution system 100 including power distribution units (PDUs) 1 and 2, designated with reference numerals 102 and 104, respectively, operatively connected together via a bi-directional link system, generally designated 106, for delivery of power between each other in accordance with embodiments of the present disclosure. Referring to FIG. 1, the system 100 includes power sources 1 and 2, designated with reference numerals 108 and 110, respectively, that are operably connected to PDUs 102 and 104, respectively, for providing electric power to the PDUs 102 and 104, respectively. For example, outputs of power sources 108 and 110 may be connected to power inlets 112 and 114, respectively, of the PDUs 102 and 104. In this example, each power source 108 and 110 may provide 60 amperes (A) of alternating current (AC) power. In another example, the range can be between about 20 and 63 A. Alternatively, for example, each power source 108 and 110 may provide between about 200 and 250 Volts of AC, or any other suitable electric power. In other examples, a power source may be a single-phase system, a three-phase system, or any other suitable type.

In operation and when fully functional or at least sufficiently functional for supplying power, power sources 108 and 110 may supply electric power to PDUs 102 and 104, respectfully, via cables, 116 and 118, respectfully. Arrows 116A and 118A show the direction of power being supplied to power inlets 1 and 2 of PDU 102 and 104, respectively. Further, the PDUs 102 and 104 may each include an electric power router 119 that is configured to route and to distribute electric power received from power sources 108 and 110, respectively, to groups of power supply units (PSUs) (numbered individually 1-6 in each group) 120 and 122, respectively. The PSUs each function as power outlets, thus in this example PDU 102 has 6 power outlets, and PDU 104 has 6 power outlets. For example, the electric power router 119 may deliver to each PSU 1-6 in group 120 AC power at 30 A. In another example, the range can be between about 20 and 63 A. The PSUs may be connected or available for connection to one or more servers and/or other network equipment held in a server chassis. For example, one or more of the PSUs in group 120 may be connected to one or more servers in a group (designated group A 124) and provide 30 A of AC power. Further, for example, one or more of the PSUs in group 122 may be connected to one or more servers in a group (designated group B 126) and provide 30 A of AC power. It is noted that PDUs 102 and 104 and groups A and B 124 and 126 of the servers and/or other network equipment may be held by a server chassis.

In accordance with embodiments, PDUs 102 and 104 may each include another power inlet 128 and 130, respectively. Each power inlet 128 and 130 is operable to receive power supplied from a power source that is an alternative to power sources 108 and 110, respectively, for distribution of electric power to groups 124 and 126, respectively. The electric power from the alternate power source may be needed in the instance of a power failure of power sources 108 or 110, or insufficient power being supplied by power sources 108 or 110. In such an instance, one of PDUs 102 and 104 may be provided electric power from the other PDU at its power inlet 112 or 114, respectively, as will be described in more detail herein.

In an example of a failure condition at power source 108, electric power router 119 may determine that the power source 108 is no longer delivering electric power to power inlet 112 of PDU 102. In response to determining that the power source 108 is in a fault condition, the electric power router 119 may communicatively engage PDU 104 for managing receipt of electric power from the PDU 104. For example, the electric power router 119 of PDU 102 may communicate to PDU 104 a signal (represented by arrow 132) indicating a fault condition or otherwise that requests provision of electric power from PDU 104. The signal 132 may be suitably communicated to PDU 104, such as via a cable 134 of the bi-directional link system 106. Subsequently, the electric power router 119 of PDU 104 may receive the indication of the fault condition, and route electric power from power source 110 to power inlet 128 of PDU 102 in response to receipt of the indication. For example, the power may be provided via cable 134. Arrow 134A depicts the direction of the flow of electric power from PDU 104 to PDU 102 via the cable 134. The electric power router 119 at PDU 102 may route and distribute the electric power received at power inlet 128 to PSUs 1-6 in group 120.

Conversely, in the event of a fault condition at power source 110, PDU 104 may similarly request power from PDU 102. Upon receipt of the request, PDU 102 may similarly provide electric power to PDU 104. In this scenario, the power may be provided via cable 134 or another cable operatively connecting PDUs 102 and 104. Arrow 134B depicts the direction of the flow of electric power from PDU 102 to PDU 104 via the cable 134. The electric power router 119 at PDU 104 may route and distribute the electric power received at power inlet 130 to PSUs 1-6 in group 122.

Figure 2:
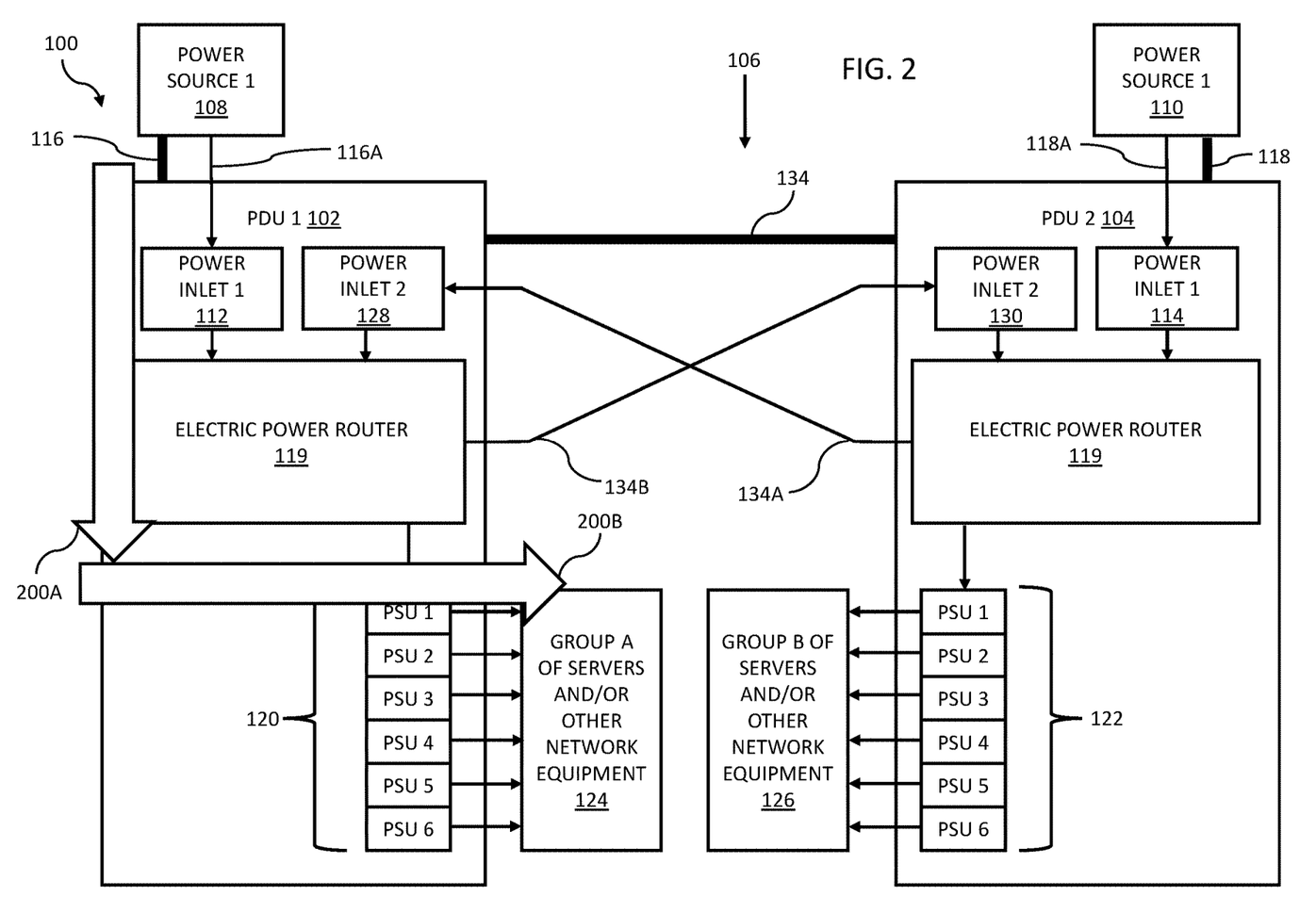
FIG. 2 is a block diagram of the power distribution system with arrows showing the direction of flow of electric power from power source to servers and/or other network equipment of a group when a power source is functional in accordance with embodiments of the present disclosure.

FIG. 2 illustrates a block diagram of the power distribution system 100 with arrows 200A and 200B showing the direction of flow of electric power from power source 108 to the servers and/or other network equipment of group A 124 when power source 108 is functional in accordance with embodiments of the present disclosure. Referring to FIG. 2, electric power router 119 can use a sensor to detect delivery of power from the power source 108 to its power inlet 112. In this scenario, electric power from power source 108 may be delivered from power source 108 to the electric power router 119 via the power inlet 112 in the general direction of arrow 200A. The electric power router 119 may in turn deliver and distribute its received electric power among PSUs 1-6 of group 102. Any servers and/or network equipment of group 124 that are operatively connected to any of PSUs 1-6 of group 120 may receive the electric power. The general direction of the delivery of electric power from router 119 to any such connected servers and/or network equipment is depicted by direction arrow 200B. Power may continue to be delivered from power source 108 to the PSUs 106 of group 120 for powering connected equipment in this manner while power source 108 is functioning to supply electric power to power inlet 112 of PDU 102.

Figure 3:
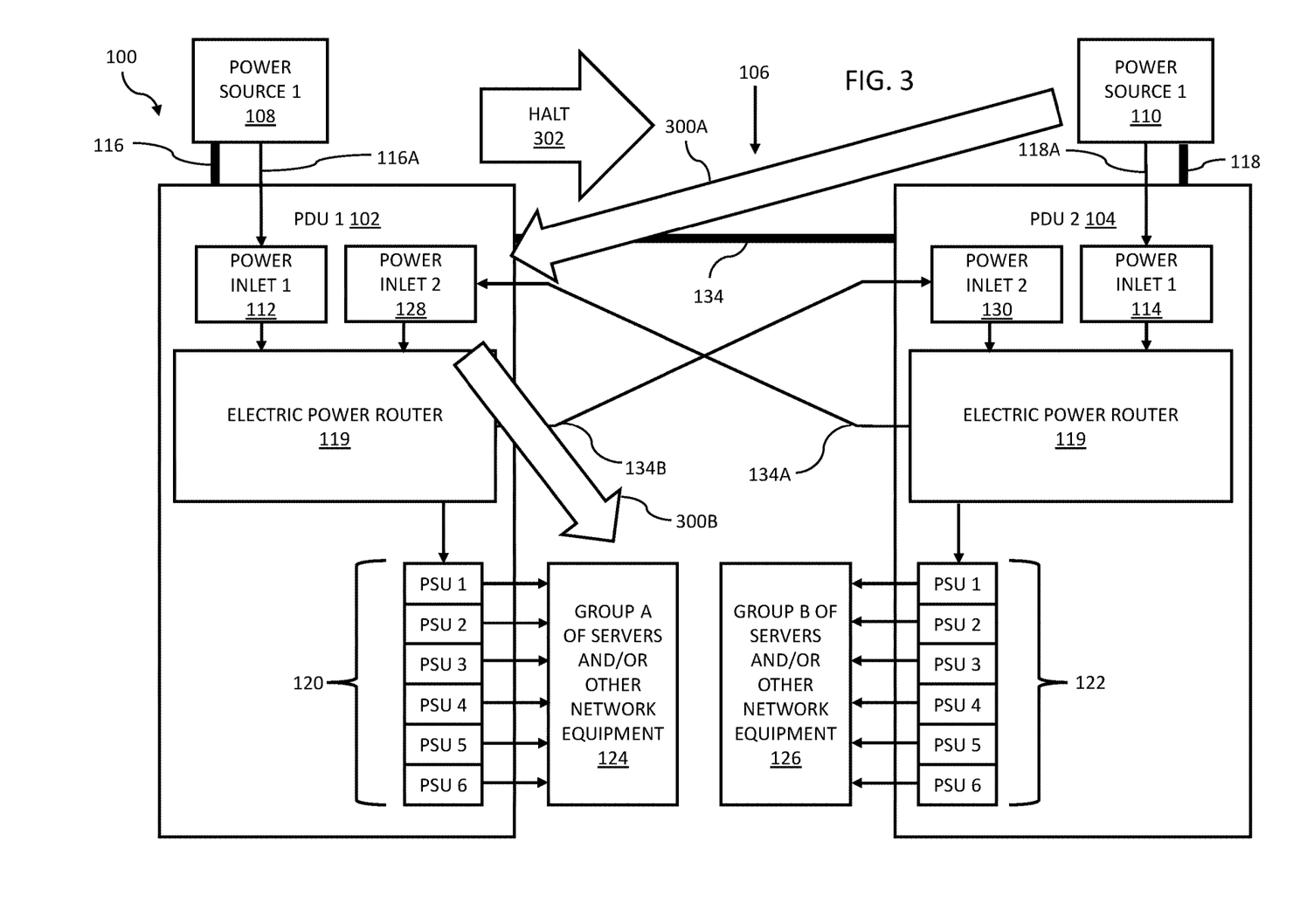
FIG. 3 is a block diagram of the power distribution system with arrows showing the direction of flow of electric power from a power source to servers and/or other network equipment of a group when a power source is not functional in accordance with embodiments of the present disclosure.

FIG. 3 illustrates a block diagram of the power distribution system 100 with arrows 300A and 300B showing the direction of flow of electric power from power source 110 to the servers and/or other network equipment of group A 124 when power source 108 is not functional in accordance with embodiments of the present disclosure. Referring to FIG. 3, subsequent to receiving indication (e.g., via message 132) that power source 108 has faulted, the electric power router 119 may direct electric power received from power source 110 to power inlet 128 of the PDU 102. The general direction of the delivery of electric power from power source 110 to power inlet 128 of the PDU 102 is depicted by direction arrow 300A. The electric power router 119 of the PDU 102 may receive the power delivered to power inlet 128 of PDU 102, and may route and distribute this electric power among PSUs 1-6 of group 102. Any servers and/or network equipment of group 124 that are operatively connected to any of PSUs 1-6 of group 120 may receive the electric power. The general direction of the delivery of electric power from power inlet 128 of PDU 102 to any such connected servers and/or network equipment is depicted by direction arrow 300B. Power may continue to be delivered from power source 110 to the PSUs 106 of group 120 for powering connected equipment in this manner while power source 108 is not functioning.

With continuing reference to FIG. 3, electric power router 119 of PDU 102 may continuously or periodically detect whether power source 108 becomes functional such that it can deliver power to power inlet 112 of PDU 102. In response to detecting that the power source 108 is functional, the electric power router 119 of the PDU 102 may communicate a message 302 to PDU 104 to halt or to prevent the supply of power from PDU 104 to PDU 102. The electric power router 119 of PDU 104 may receive the indication to halt or to prevent the supply of power, and in turn may prevent the routing of electric power to PDU 102 in response to receipt of the indication that electric power is not needed. The electric power source 119 of PDU 102 may route electric power from power source 108 to PSUs 120 in response to detecting the power source 108 is functional. In this manner, the supply of electric power provided to PSUs of group 120 by power source 110 to power source 108 is handed over by cooperation of electric power routers 119 of PDUs 102 and 104. Electric power routers 119 of PDUs 102 and 104 communicate together to coordinate the handoff.

The provision of electric power may be handed off may be effected by any suitable technique. For example, transistor logic hardware may detect voltage signaling for determining whether to perform handoff. In this example, the cable 134 may include 3 wires in addition to high power wires, or the PDUs 102 and 104 may be separately connected by the 3 wires. The wires may include a wire for Signal 1, a wire for Signal 2, and a wire for ground. Signal 1 may be self-powered and go to Signal 2 on the other PDU. Signal 2 may be passive and go to Signal 1 on the other PDU. If a PDU senses an AC loss, it may drop voltage on Signal 1 and switch its main input to the bridge input. If a PDU senses a voltage drop on Signal 2 input, it may route part of its input power to the bridge. If both signal pins drop, there is no action as this would mean a total AC loss in both PDUs. If both signal pins are high, there is no action (i.e., no outages).

Figure 4:
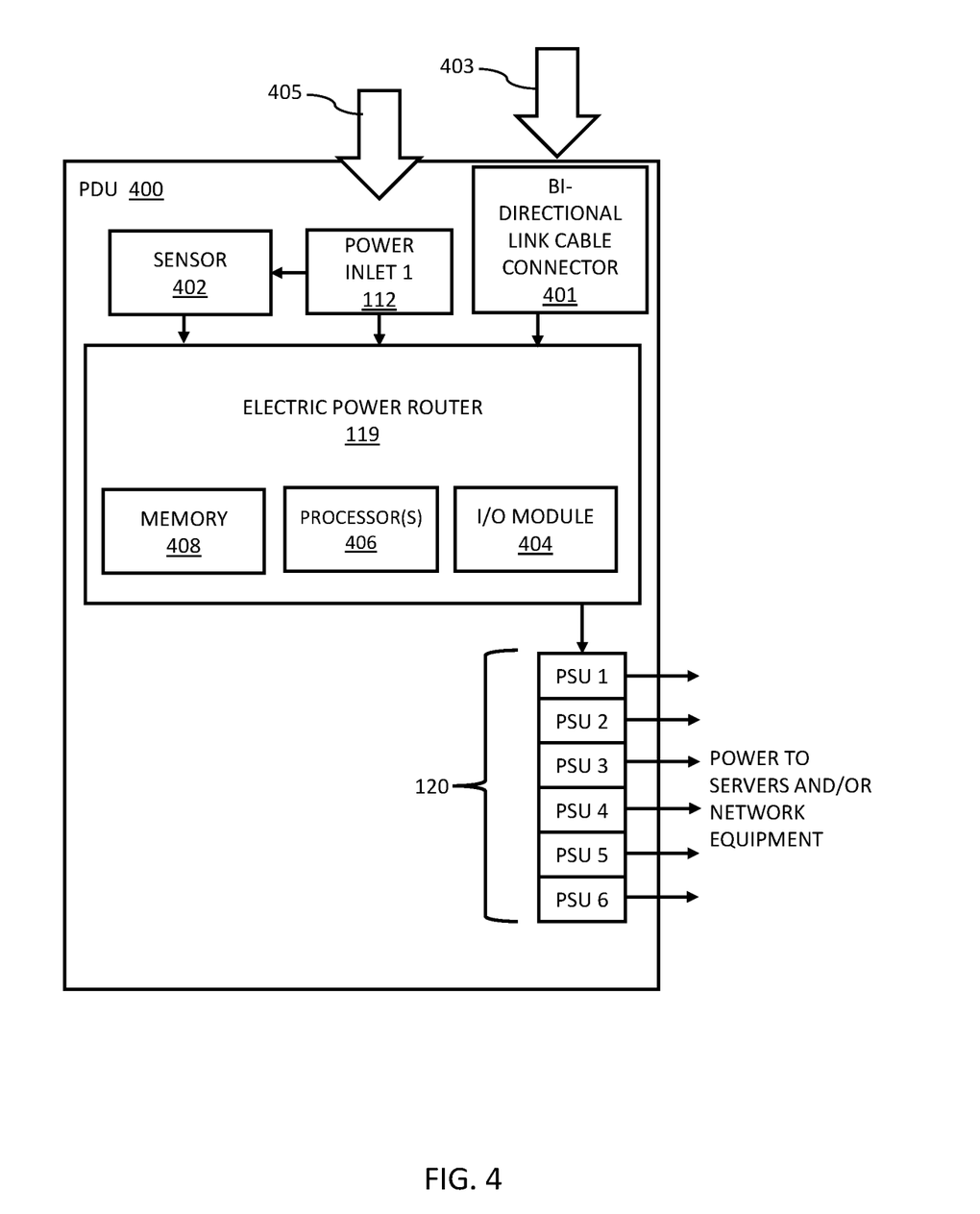
FIG. 4 is a block diagram of an example PDU configured to deliver and to receive electric power to another PDU in accordance with embodiments of the present disclosure.

FIG. 4 illustrates a block diagram of an example PDU 400 configured to deliver and to receive electric power to another PDU in accordance with embodiments of the present disclosure. Referring to FIG. 4, the PDU 400 may include an electric power router 119 configured to determine whether a primary power source connected to power inlet 112 is in a fault condition for delivering electric power to power inlet 112. The PDU 400 may include a sensor 402 configured to detect delivery of power from the power source to power inlet 112. For example, the sensor 402 may be operatively connected to power inlet 112 for detecting whether power is delivered to the power inlet 112. The sensor 402 may be operatively connected to the electric power router 119 to provide a signal to the electric power router 119 that indicates whether any, sufficient, and/or suitable power is being delivered to the power inlet 112. In an example, the electric power router 119 may use the sensor 402 to detect load of electric power at the power inlet 112 for determining whether any, sufficient, and/or suitable power is being delivered to the power inlet 112. In an example, power may be detected by a voltage meter that operates in parallel to input circuitry, and directly attached to the aforementioned transistor logic hardware that guides switching.

In response to determining that the primary power source is in the fault condition, the electric power router 119 may communicatively engage another PDU for managing receipt of electric power from the other PDU. For example, the electric power router 119 may include an input/output (I/O) module 404 configured to communicate to another PDU that a fault condition exists. In an example, I/O module 404 may be implemented for communicating to another PDU with transistor logic hardware described by example herein. This hardware may use, for example, protocols such as i2C, SNMP, or the like. There may be an implementation of multiple types of communications, such as direct transistor logic for the transfer controls and a slower protocol for data transit. These can be used in conjunction such as for centralized logging of power events, power balancing, statistics and remote administration/monitoring. They can be implemented through the bridge cable and also through standard ports such as Ethernet RJ45. The communication may be, for example, via a power cable, a communication cable, wireless communication, or the like. One PDU can communicate a fault condition to another PDU through, for example, the aforementioned transistor logic using AC or DC power to actuate directly over a power logic circuit, which may include capacitors, transistors, relays, and the like. In other example of "smart" functions, router 119 may include two components: one for the basic power transfer logic which is in charge of the fast switching of the high voltage part; and another component for the "smart" part, which is monitoring over network, statistics, individual port controls, manual override of the transfer logic (such as for testing or for maintenance), logging, and such. The other PDU may acknowledge receipt of the communication. Subsequently, PDU 400 and the other PDU may coordinate for the delivery of electric power from the other PDU to PDU 400 at a bi-directional link cable connector 401. Arrow 403 is representative of electric power input into connector 401, and arrow 405 is representative of electric power input into power inlet 112. Further, PDU 400 and the other PDU may be connected as shown in FIG. 1 such that power may be delivered to PDU 400. Subsequently, the other PDU may supply electric power to the electric power router 119 of PDU 400 where the received electric power can be distributed to PSUs 1-6.

PDU 400 may coordinate with another PDU to provide electric power to the other PDU. For example, the I/O module 404 may be operatively connected to another PDU for receipt of communications. The I/O module 404 may receive a message indicating that the primary power source at the other PDU is in a fault condition to thereby indicate that power is needed at the other PDU. In response to receiving the indication, the electric power router 119 can route, to the other PDU, electric power received at power inlet 112 to the other PDU.

The electric power router 119 may be configured to implement the functionality described herein. The electric power router 119 may include hardware, software, firmware, and combinations thereof. For example, the electric power router 119 may include one or more processors 406 and memory 408 for implementing the functionality described herein. The processor(s) 406 may implement software code for implementing the functions of the electric power router 119.

Figure 5:
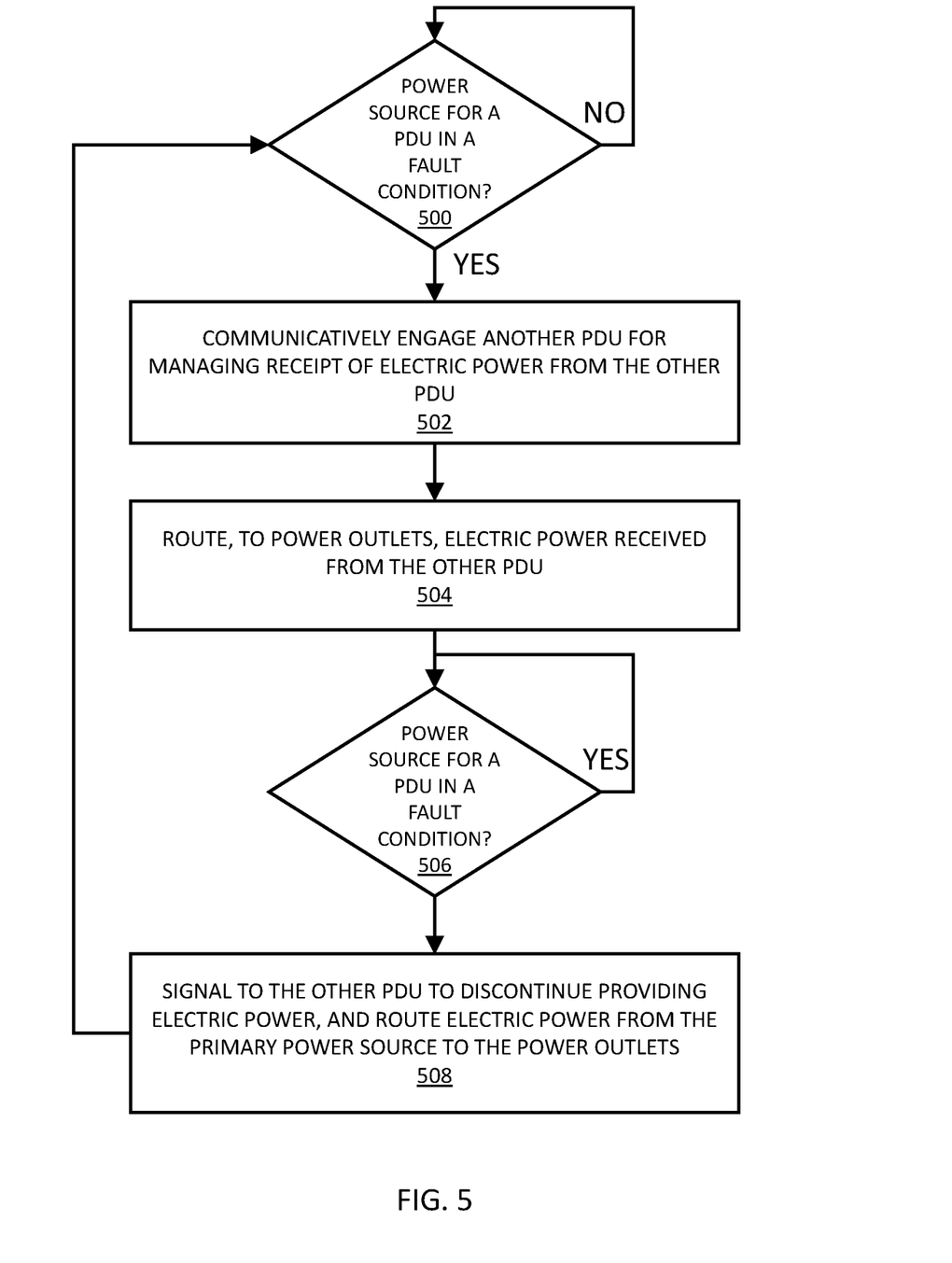
FIG. 5 is a flow chart of an example method implemented at a PDU for receiving electric power from another PDU in accordance with embodiments of the present disclosure.

FIG. 5 illustrates a flow chart of an example method implemented at a PDU for receiving electric power from another PDU in accordance with embodiments of the present disclosure. The method is described by example as being implemented by the PDU 400 shown in FIG. 4, although it should be understood that the method may be implemented by any other suitable PDU or electronic device.

Referring to FIG. 5, the method includes determining 500 whether a primary power source for a PDU is in a fault condition for delivering electric power to a power inlet of the PDU. For example, the sensor 402 shown in FIG. 4 can detect whether power is being delivered from a power source to power inlet 112. The sensor 402 may signal the failure condition to electric power router 119. The electric power router 119 may receive the signal from the sensor 402 and determine whether the primary power source is in the fault condition based on the received signal. In response to determining that the power source is not in a fault condition, the electric power router 119 may continue determining whether the power source is in a fault condition. Otherwise, in response to receiving an indication that the power source is in a fault condition, the method may proceed to step 502.

At step 502, the method includes communicatively engaging another PDU for managing receipt of electric power from the other PDU. Continuing the aforementioned example, the electric power router 119 may use its I/O module 404 to signal another PDU or electronic device to provide power. The other PDU may be connected to connector 401 of PDU 400 such that it can provide electric power to the connector 401. In response to receipt of the signal, the other PDU may provide electric power via a cable to the connector 401 of PDU 400.

The method of FIG. 5 includes routing 504, to power outlets, electric power received from the other PDU. Continuing the aforementioned example, the electric power router 119 can route power received at power inlet 128 to its PSUs 1-6 of group 120.

The method of FIG. 5 includes determining 506 whether the primary power source for the PDU is in a fault condition for delivering electric power to a power inlet of the PDU. Continuing the aforementioned example, the electric power router 119 may receive a signal from the sensor 402 that is indicative of normal operation or a fault condition of the primary power source. In response to determining that the primary source is in the fault condition, the electric power router 119 may continue to monitor the fault condition at step 506. Otherwise, in response to determining that there is no longer a fault condition (i.e., a return to normal operation at the primary power source), the method may proceed to step 508.

At step 508, the method includes signaling to the other PDU to discontinue providing electric power, and routing electric power from the primary power source to the power outlets. Continuing the aforementioned example, the electric power router 119 may signal to the other PDU to discontinue providing electric power. Further, the electric power router 119 may route power from the power inlet 112, where the primary power source is connected, to the PSUs of group 120. Subsequently, the method may return to step 500.

Figure 6:
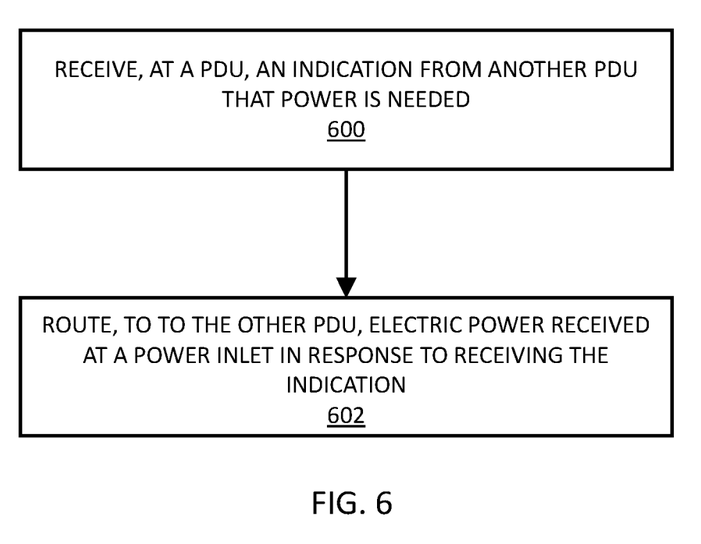
FIG. 6 is a flow chart of an example method implemented at a PDU for providing electric power to another PDU in accordance with embodiments of the present disclosure.

FIG. 6 illustrates a flow chart of an example method implemented at a PDU for providing electric power to another PDU in accordance with embodiments of the present disclosure. The method is described by example as being implemented by the PDU 400 shown in FIG. 4, although it should be understood that the method may be implemented by any other suitable PDU or electronic device.

Referring to FIG. 6, the method includes receiving 600, at a PDU, an indication from another PDU that power is needed. For example, the I/O module 404 of the PDU 400 in FIG. 4 may receive a signal indicating that another PDU needs electrical power. The electric power router 119 may receive this indication from the I/O module.

The method of FIG. 6 includes routing 602, to the other PDU, electric power received at a power inlet in response to receiving the indication. Continuing the aforementioned example, the electric power router 119 may route electrical power received at power inlet 112 to the other PDU.

In accordance with embodiments, the source of electric power supplied at a PDU, such as PDU 400, may be input into either power inlet 112 or connector 401. As described herein, there may be a switch of the power source and circuitry may be configured to suitably handle the switching of load to ensure that the switch is stable. For example, an automatic transfer switch (ATS) may handle the switch for ensuring stability. For example, the ATS may enable load transfer through a bi-directional link system, such as system 106 shown in FIG. 1. In an example, the electric power router 119 may be an ATS.

In accordance with embodiments, PDUs such as PDUs 102 and 104 shown in FIG. 1 may be connected by cable 134 in an always-active, bi-directional supply of electric power between the PDUs. In this example, the PDUs 102 and 104 may be connected at power inlets 128 and 130, respectively, which function as I/O modules for supplying or receiving electric power. When power sources 108 and 110 are operation, power received from power source 108 may be routed to PSUs 1-6 of group 120, and power received from power source 110 may be routed to PSUs 1-6 of group 122. In this approach, power input is divided on a PDU such that one-half provides power to PDUs of that PDU and that one-half provides power to PDUs of the other PDU. An electric power router may detect an input loss. For example, a sensor may detect that a power supply no longer provides power at all or sufficient power. In this instance, the PDU may instantly or nearly instantly pick up power from the cable of the bi-directional link system. In this case, communication between PDUs may be unneeded since the power is always available on the bi-directional link system. Once the power source returns to suitable functionality, the electric power router may function to ensure readjustment of the power distribution. The electric power router configured to stabilize power supplied between the first and second power distribution units. These functions may be suitably implemented by an ATS, which may include high-current transistors and relays with a capacitor bank, transformers and voltage regulators to stabilize output during transitions.

The present subject matter may be a system, a method, and/or a computer program product. The computer program product may include a computer readable storage medium (or media) having computer readable program instructions thereon for causing a processor to carry out aspects of the present subject matter.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a RAM, a ROM, an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network, or Near Field Communication. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present subject matter may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++, Javascript or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present subject matter.

Aspects of the present subject matter are described herein with reference to flowchart illustrations and/or block diagrams of methods, apparatus (systems), and computer program products according to embodiments of the subject matter. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present subject matter. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiments have been described in connection with the various embodiments of the various figures, it is to be understood that other similar embodiments may be used, or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed is:

1. A power distribution unit comprising:
a first power inlet configured to receive electric power from a power source;
a second power inlet configured to receive electric power from another power distribution unit;
a plurality of power outlets; and
an electric power router configured to:
determine whether the power source is in a fault condition for delivering electric power to the first power inlet; and
in response to determining that the power source is in the fault condition:
communicatively engage the other power distribution unit for managing receipt of electric power from the other power distribution unit;
receive, at the second power inlet, electric power from the other power distribution unit; and
route, to the power outlets, the electric power received from the other power distribution unit.

2. The power distribution unit of claim 1, wherein the electric power router is configured to route electric power received from the power source to the power outlets.

3. The power distribution unit of claim 1, further comprising a sensor configured to detect delivery of power from the power source to the first power inlet, and
   wherein the electric power router determines whether the power source is in a fault condition based on the detection of power delivery from the power source by the sensor.

4. The power distribution unit of claim 1, wherein communicatively engaging the other power distribution unit for managing receipt of electric power from the other power distribution unit comprises communicating with the other power distribution unit to indicate the fault condition.

5. The power distribution unit of claim 1, further comprising a cable comprising a first end and a second end, the first end being operatively connected to the second power inlet, and the second end being configured for connection to a power outlet of the other power distribution unit for receipt of electric power from the other power distribution unit.

6. The power distribution unit of claim 1, wherein the electric power router is configured to:
   detect load of electric power from the other power distribution unit at the second power inlet; and
   in response to detecting load of electric power from the other power distribution unit, route the electric power from the second power inlet to the power outlets.

7. The power distribution unit of claim 1, wherein the electric power router is configured to:
   determine that the power source is not in a fault condition for delivering electric power to the first power inlet; and
   in response to determining that the power source is not in the fault condition, indicate to the other power distribution unit that electric power from the other power distribution unit is not needed.

8. The power distribution unit of claim 7, wherein the electric power router is configured to route, to the power outlets, electric power received from the power source.

9. The power distribution unit of claim 1, wherein the electric power router comprises an automatic transfer switch.

10. A power distribution unit comprising:
    a power inlet configured to receive electric power from a power source;
    a power outlet configured to deliver power to another power distribution unit;
    an electric power router configured to:
      receive an indication from the other power distribution unit that power is needed; and
      route, to the other power distribution unit, electric power received at the power inlet in response to receiving the indication.

11. The power distribution unit of claim 10, further comprising a plurality of other power outlets, and
    wherein the electric power router is configured to route power received at the power inlet to the other power outlets.

12. The power distribution unit of claim 10, further comprising a cable comprising a first end and a second end, the first end being operatively connected to a power outlet of the power distribution unit, and the second end being configured for connection to a power inlet of the other power distribution unit for delivery of the routed electric power to the other power distribution unit.

13. The power distribution unit of claim 10, wherein the electric power router is configured to:
    receive, from the other power distribution unit, an indication that the other power distribution unit does not need the electric power from the power distribution unit; and
    prevent the routing of the electric power to the other power distribution unit in response to receipt of the indication.

14. The power distribution unit of claim 10, wherein the power inlet is a first power inlet,
    wherein the power distribution unit further comprises a second power inlet configured to receive electric power from the other power distribution unit,
    wherein the power distribution unit further comprises a plurality of other power outlets, and
    wherein the electric power router is configured to:
      determine whether the power source is in a fault condition for delivering electric power to the first power inlet; and
      in response to determining that the power source is in the fault condition:
        communicatively engage the other power distribution unit for managing receipt of electric power from the other power distribution unit;
        receive, at the second power inlet, electric power from the other power distribution unit; and
        route, to the plurality of other power outlets, the electric power received from the other power distribution unit.

15. The power distribution unit of claim 10, wherein the electric power router comprises an automatic transfer switch.

16. A power distribution system comprising:
    a power inlet configured to receive electric power from a first power source;
    a plurality of power outlets for distribution of the electric power received from the first power source; and
    an input/output module configured to receive from a second power distribution unit and to deliver electric power to the second power distribution unit via a bi-directional link cable operatively connecting the input/output module to a second input/output module of the second power distribution unit; and
    an electric power router configured to:
      determine whether the power source is in a fault condition for delivering electric power to the power inlet;
      in response to determining that the power source is in the fault condition:
        communicatively engage the other power distribution unit for managing receipt of electric power from the other power distribution unit;
        receive, at the input/output module, electric power from the other power distribution unit; and
        route, to the power outlets, the electric power received from the other power distribution unit;
      receive an indication from the other power distribution unit that power is needed; and
      in response to receiving the indication, route, to the other power distribution unit, electric power received at the power inlet.

17. The power distribution system of claim 16, wherein the power outlets each comprise a power supply unit.

18. The power distribution system of claim 16, further comprising an electric power router configured to stabilize power supplied between the first and second power distribution units.

19. The power distribution system of claim 16, wherein the input/output module is configured to receive the indication on the same conductors of the bi-directional link cable as distribution of electric power.

20. The power distribution system of claim 16, wherein the electric power router is configured to receive the indication via the bi-directional link cable.

* * * * *